United States Patent [19]

Herben

[11] Patent Number: 4,724,758
[45] Date of Patent: Feb. 16, 1988

[54] NUMERING CAM FOR PRINTING MACHINES

[76] Inventor: William J. Herben, 4/18A Bessemer St., Blacktown, New South Wales 2148, Australia

[21] Appl. No.: 70,654

[22] Filed: Jul. 1, 1987

Related U.S. Application Data

[63] Continuation of Ser. No. 861,614, May 5, 1986, abandoned, which is a continuation of Ser. No. 634,809, Jul. 26, 1984, abandoned.

[30] Foreign Application Priority Data

Jul. 29, 1983 [AU] Australia ............................. PG0546

[51] Int. Cl.$^4$ ............................. B41F 3/86; B41J 1/60
[52] U.S. Cl. ......................................... 101/77; 101/86
[58] Field of Search .................... 101/76, 77, 85, 86, 101/87, 246, 409, 410, 411, 110; 74/567, 568 R, 569, DIG. 4

[56] References Cited

U.S. PATENT DOCUMENTS 764,289  7/1904  Harris ............................. 101/87 X

FOREIGN PATENT DOCUMENTS 1198201 12/1959 France ............................. 74/DIG. 4
 522383  6/1940 United Kingdom ............... 101/76
 608020  9/1948 United Kingdom ............... 101/76

*Primary Examiner*—Charles Pearson
*Attorney, Agent, or Firm*—Ladas & Parry

[57] ABSTRACT

A numbering cam for a printing press having a numbering device with an operating member to cause indexing of the device, said cam having a cam surface to cause actuation of said operating member by moving said operating member from a rest position to an indexing position, and a magnet to attract said operating member to cause said operating member to return from said indexing position to said rest position.

4 Claims, 7 Drawing Figures

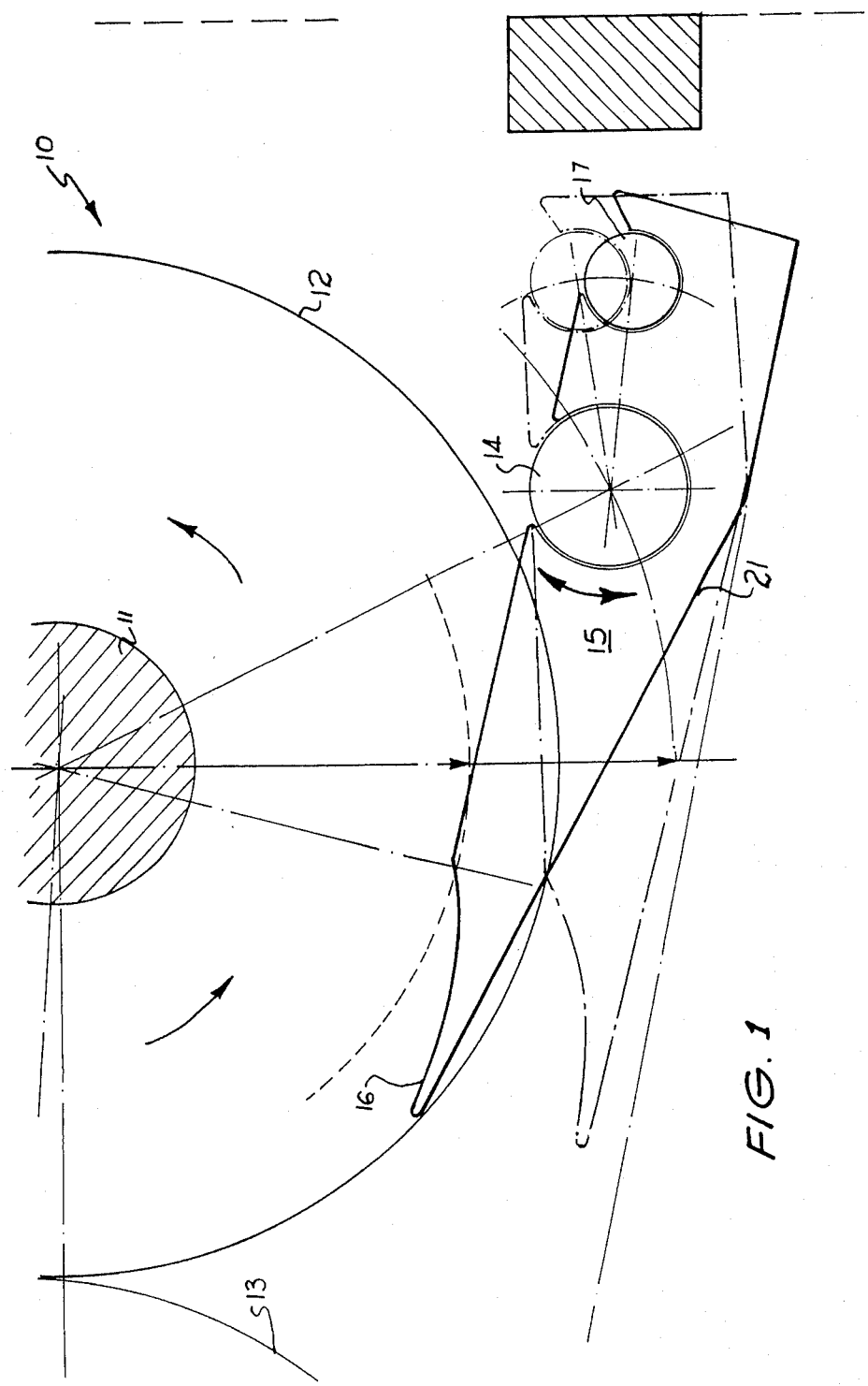

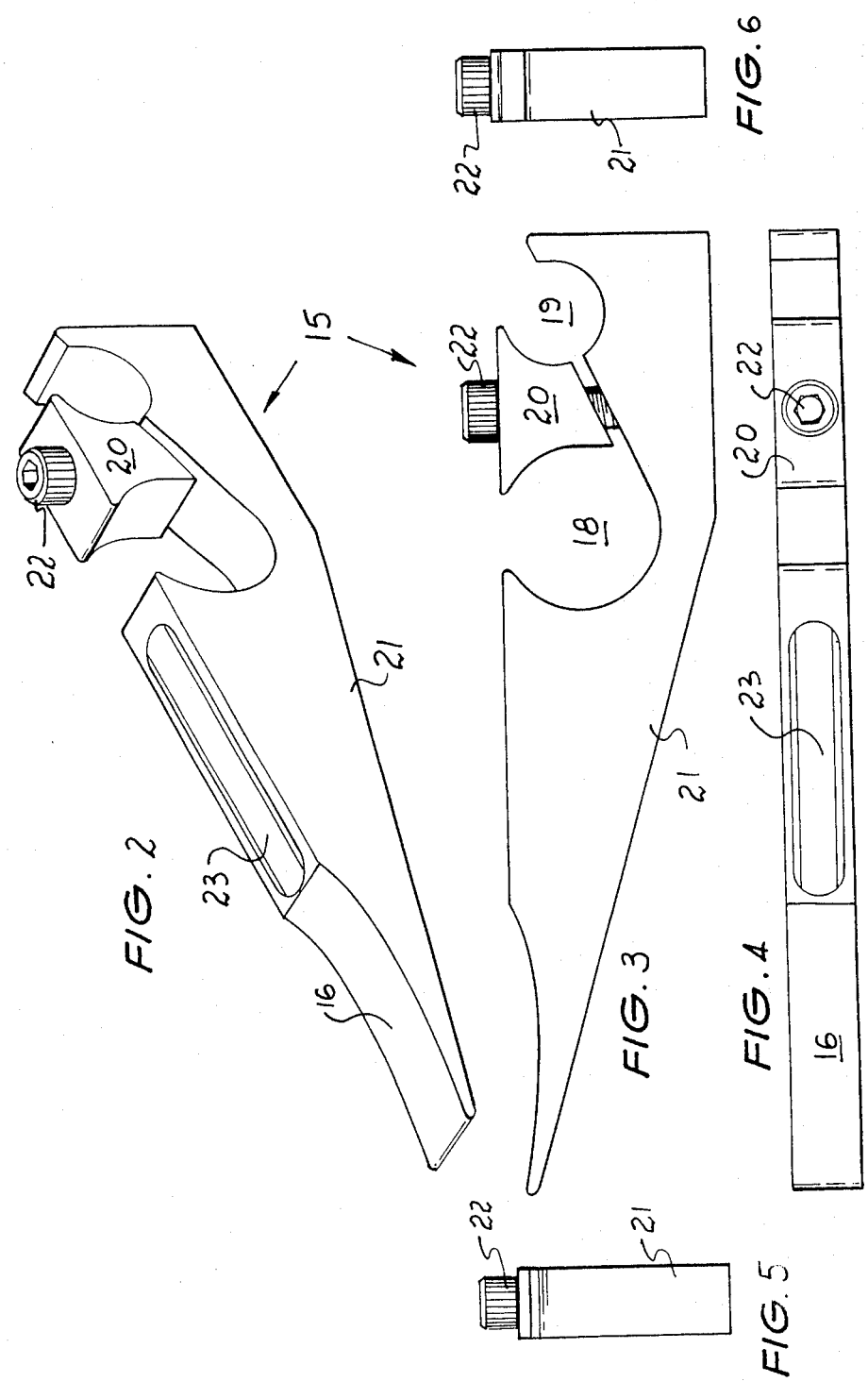

NUMERING CAM FOR PRINTING MACHINES

This is a continuation of co-pending application Ser. No. 861,614 filed on May 5, 1986, which is a continuation of 634,809, filed on July 26, 1984, now both abandoned.

The present invention relates to printing machines and more particularly but not exclusively to offset printing machines and the indexing of numbering devices associated therewith.

In the use of Heidelberg offset printing machines, the numbering devices which travel in rotation with the printing rollers, employ a numbering cam to cause indexing of the numbering device. These numbering cams have a track which engage an indexing lever on the numbering device, however it is the disadvantage of these known indexing cams that they occupy considerable width along the longitudinal axis of the printing roller thereby restricting available space for other printing or perforating operations. Additionally, these known numbering cams are only suitable for single left and right hand use with the result that a considerable number of cams must be retained in stock in order to meet any necessary need that may arise.

It is the object of the present invention to overcome or substantially ameliorate the above disadvantages.

There is disclosed herein a numbering cam for a printing press to receive a printing device having an indexing mechanism with an operating member of magnetic material movable from a rest position to an indexing position, said cam having an elongated body, a cam surface formed in said body adjacent one end of said body to engage said member to cause indexing of said mechanism by moving said member from said rest position to said indexing position, mounting means at the other end of said body enabling mounting of said cam in said printing press so that said cam surface is positioned to engage said member, and a magnet mounted adjacent said cam surface to attract said member to move or to aid in moving said member from said indexing position to said rest position.

A preferred form of the present invention will now be described by way of example with reference to the accompanying drawings wherein:

FIG. 1 is a schematic side elevation of a printing roller and a numbering cam;

FIG. 2 is a schematic perspective view of the numbering cam of FIG. 1;

FIG. 3 is a schematic side elevation of the numbering cam of FIG. 2;

FIG. 4 is a schematic top plan view of the numbering cam of FIG. 2;

FIG. 5 is a schematic end elevation of the numbering cam of FIG. 2;

FIG. 6 is a further schematic end elevation of the numbering cam of FIG. 2; and

Figure 7:
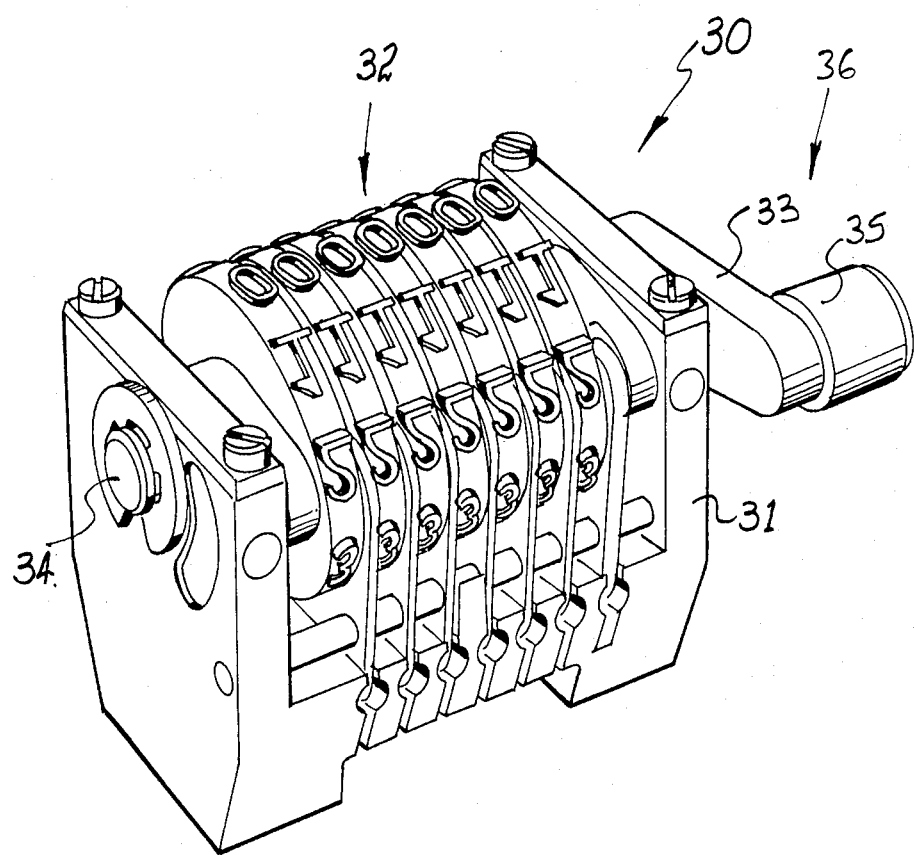
FIG. 7 is a schematic perspective view of a numbering device to be employed with the printing roller and numbering cam of FIG. 1.

In the accompanying drawings there is schematically depicted a numbering assembly 10 of a printing press such as a Heidelberg printing press. The numbering assembly 10 includes a numbering shaft 11 to which there is attached a support 12 for a numbering device. The shaft 11, support 12, and numbering device are well known and commercially available. The numbering assembly 10 cooperates with a roller 13 in applying a sequence of numbers to a sheet material passing between the roller 13 and numbering assembly 10. The numbering device includes an operating member such as a lever to cause indexing of the device so that a sequence of numbers is printed on the sheet material. The operating member is moved radially relative to the shaft 11 to cause indexing.

Mounted on a shaft 14 is a numbering cam 15 adapted to engage the operating member of the numbering device so as to cause indexing. More particularly the numbering cam 15 has a cam surface 16 which engages the operating member so as to cause the radially inward movement thereof to effect indexing. The cam surface 16 is generally arcuate. The numbering cam 15 is rotatably mounted on the shaft 14 so as to be moved from the position depicted in FIG. 1 to the position depicted in ghost lines whereat indexing is not effected. Movement of the numbering cam 15 from the operative to the inoperative position is achieved by means of an operating rod 17 which is moved in an arcuate path to effect movement of the numbering cam 15.

Now, with particular reference to FIGS. 2 to 6, the numbering cam 15 is more fully depicted. The numbering cam 15 is provided with a first recess 18 within which the shaft 14 is rotatably received. A second recess 19 is provided for the rod 17. To fix the cam member 15 to the shaft 14 and rod 17, there is provided a securing member 20 fixed to the body 21 of the cam member 15 by means of an Allen screw 22.

Mounted within the body 21 adjacent the cam surface 16 is a magnet 23. The magnet 23 attracts the operating member as the operating member is formed of magnetic material.

In operation of the abovedescribed numbering cam 15, the cam surface 16 causes radially inward movement of the operating member from a radially outer rest position to a radially inner indexing position. However, the magnet 23 attracts the operating member and upon the operating member leaving the cam surface 16, is caused to move radially outwardly under the influence of the magnet 23 so as to be returned to the rest position.

FIG. 7 schematically depicts a numbering device 30 to be mounted on the support 12 described with reference to FIG. 1. The numbering device 30 includes a body 31 to be fixed to the support 12. The body 31 pivotally supports a shaft 34 to which there is fixed an operating member at 36. The operating member at 36 includes a lever 33 fixed to the shaft 34, which lever 33 rotatably supports roller 35 which engages the numbering cam 15. The numbering cam 15 causes angular reciprocation of the operating member at 36 in order to cause indexing of numbered rollers at 32.

What I claim is:

1. A numbering cam for a printing press, which press has a printing device employing a numbering mechanism with an operating member of magnetic material, said operating member being movable from a rest position to an indexing position to cause indexing of said mechanism, said numbering cam having an elongated body past which said operating member moves from one end of said body toward the other end thereof, an elongated cam surface formed on said body so as to extend longitudinally thereof from adjacent said one end of said body so as to engage said operating member to cause indexing of said mechanism by moving said operating member from said rest position to said indexing position as said operating member moves along said cam surface from said one end, mounting means at the other end of said body enabling mounting of said cam in said printing press so that said cam surface is positionable to engage said operating member, and an elongated magnet mounted in said body adjacent said cam surface, said magnet having a magnet surface continuing from said cam surface longitudinally of said body towards said other end and facing in the same direction as said cam surface, said magnet being provided to attract said operating member, as it leaves said cam surface, to move said operating member from said indexing position to said rest position as said operating member moves along said body adjacent said magnet.

2. The cam (15) of claim 1 further including a first recess (18) to receive a mounting shaft (14), (and) a second recess (19) to receive an operating rod (17) to move the cam (15) from an operative to an inoperative position.

3. The cam (15) of claim 2 further including a securing member (20) removably attachable to said body (21) and partly defining said first and second recess (18), (19) so as to fix said body (21) to said shaft (14) and operating rod (17).

4. A number cam as claimed in claim 1 wherein said magnet attracts and moves said operating member radially outward to a rest position.

* * * * *